United States Patent [19]

Herak et al.

[11] Patent Number: 5,627,269

[45] Date of Patent: May 6, 1997

[54] PROCESS FOR THE EXTRACTION OF SOLUBLE POLYSACCHARIDES

[75] Inventors: David C. Herak, Wilmington; John J. Hoglen, Newark, both of Del.

[73] Assignee: Hercules Incorporated, Wilmington, Del.

[21] Appl. No.: 264,107

[22] Filed: Jun. 22, 1994

[51] Int. Cl.$^6$ .................... C08B 37/04; C08B 37/06; C07H 1/06; C07H 1/08
[52] U.S. Cl. .................... 536/2; 536/3; 536/30; 536/123.1; 536/124; 536/128
[58] Field of Search .................... 536/2, 3, 30, 123.1, 536/124, 1.11, 128

[56] References Cited

U.S. PATENT DOCUMENTS

| | | | |
|---|---|---|---|
| 1,814,981 | 7/1931 | Thornley et al. | 536/3 |
| 2,132,065 | 10/1938 | Wilson | 536/2 |
| 2,444,266 | 6/1948 | Owens et al. | 536/2 |
| 2,548,895 | 4/1951 | Graham et al. | 536/2 |
| 2,551,143 | 5/1951 | Lian | 536/3 |
| 2,586,407 | 2/1952 | Walsh et al. | 536/2 |
| 2,593,528 | 4/1952 | Bolley et al. | 536/114 |
| 2,709,699 | 5/1955 | Wolf et al. | 536/128 |
| 2,801,955 | 8/1957 | Rutenberg et al. | 536/128 |
| 3,176,003 | 3/1965 | Stancioff | 536/122 |
| 3,337,526 | 8/1967 | Adams | 536/128 |
| 3,509,126 | 4/1970 | Dahl | 536/2 |
| 3,716,526 | 2/1973 | Schweiger | 536/114 |
| 3,773,753 | 11/1973 | Wright et al. | 264/144 |
| 3,901,873 | 8/1975 | Dori et al. | 536/114 |
| 3,907,770 | 9/1975 | Strong | 536/114 |
| 4,038,481 | 7/1977 | Antrim et al. | 536/56 |

OTHER PUBLICATIONS

Graham, R. P., et al., "Pilot Plant Production of Low--Methoxyl Pectin from Citrus Peel," Agricultural and Food Chemistry, vol. 1, No. 16, Oct. 28, 1953, pp. 993–1001.

*Primary Examiner*—John Kight
*Assistant Examiner*—Everett White
*Attorney, Agent, or Firm*—David Edwards; J. W. Patterson

[57] ABSTRACT

Soluble polysaccharides such as pectin and carrageenan are extracted from vegetable matter by passing an extraction fluid through a fixed bed of the polysaccharide-containing vegetable material to simultaneously hydrolyze and extract the polysaccharide from the vegetable material and separate the polysaccharide-containing solution from the remaining solid vegetable material. No separate filtration step is required. A filler can optionally be added to the vegetable material to increase the rate of percolation of the extraction fluid through the bed.

30 Claims, 1 Drawing Sheet

PROCESS FOR THE EXTRACTION OF SOLUBLE POLYSACCHARIDES

FIELD OF THE INVENTION

This invention relates to a process for the extraction of soluble polysaccharides from vegetable material.

BACKGROUND OF THE INVENTION

Various methods have been used in the past to extract soluble polysaccharides such as agar-agar, alginates, carrageenan, hemicellulose, and pectin from solid vegetable material. U.S. Pat. No. 3,901,873 discloses the extraction of agar from red algae by subjecting the raw algae to the action of a screw-extruder and then extracting in an autoclave in the presence of sulfuric acid. U.S. Pat. No. 1,814,981 discloses the formation of calcium alginate fibers by crushing and digesting raw kelp in a warm $Na_2Co_3$ solution, extracting with warm water, and treating with calcium chloride. U.S. Pat. No. 3,907,770 discloses a process for extracting carrageenan from seaweed by digesting a seaweed slurry in a long column at an elevated temperature with water and an alkali metal or alkaline earth metal hydroxide. U.S. Pat. No. 3,337,526 discloses a counter-current extraction process for making arabinogalactan in which larch wood chips are driven by a worm screw through a multistage tubular extractor.

Pectin is typically hydrolyzed and extracted from citrus peel or other sources of pectin such as apple pomace. Acidified water (pH 1.5–2.5) is typically used as the extraction medium at temperatures of 60° to 95° C. for a time period ranging from 30 minutes to several hours. The extraction step is typically carried out in an aqueous slurry in a batch reactor with minimal agitation, followed by a separation using various combinations of centrifugation and/or filtration. The final separation step is usually a polishing filtration with a filter aid such as diatomaceous earth to produce a clear pectin extract that will produce highly transparent gels. Pectins are isolated from the extract solution by precipitation with alcohol, usually after an evaporative concentration. The isolation is followed by washing with alcohol, pressing, drying, and milling.

Other methods for extracting pectin have also been described. For example, U.S. Pat. No. 2,548,895 describes a continuous countercurrent process for extraction of pectin from citrus peel. A slurry of citrus peel is moved through an elongated trough with a U-shaped cross-section using a screw, and the acidified water flows in the opposite direction. The extract is filtered with diatomaceous earth. U.S. Pat. No. 2,586,407 discloses a process for the extraction of pectic substances from vegetable matter by (1) passing a weak acid solution through a column of vegetable matter to replace calcium and magnesium ions linked to pectic substances, (2) washing the column of vegetable matter with water to remove the acid, and (3) extracting the acid pectate substances by passing an alkaline solution through the column.

There is still a need for an improved process for extracting pectin and other soluble polysaccharides from vegetable material.

SUMMARY OF THE INVENTION

The process of this invention for the extraction of soluble polysaccharides from solid vegetable material comprises passing an extraction fluid through a fixed bed of a polysaccharide-containing vegetable material to simultaneously hydrolyze and extract a polysaccharide from the vegetable material and separate the polysaccharide-containing solution from the remaining solid vegetable material. A filler can optionally be added to the vegetable material to increase the percolation rate of the extraction fluid through the bed.

Because the process of this invention combines the hydrolysis/extraction and solids separation steps used in conventional polysaccharide extraction processes, separate pieces of process equipment are eliminated and capital costs are significantly reduced. The invention will also result in lower operating costs because of reduced labor, energy, and filter aid requirements. The ratio of vegetable material to extraction fluid can be higher than in conventional methods, which results in a more concentrated polysaccharide solution, reducing the amount of evaporative concentration required. Because a countercurrent percolation extractor with multiple stages can be used, a higher polysaccharide recovery than with current methods is possible, thereby reducing raw material requirements. Another major benefit of the process of this invention is a more clarified extract without a separate filtration step. Because the vegetable material is not agitated or pumped, disintegration of the vegetable material and creation of colloidal material that can pass through filters is greatly reduced.

DETAILED DESCRIPTION OF THE INVENTION

Figure 1:
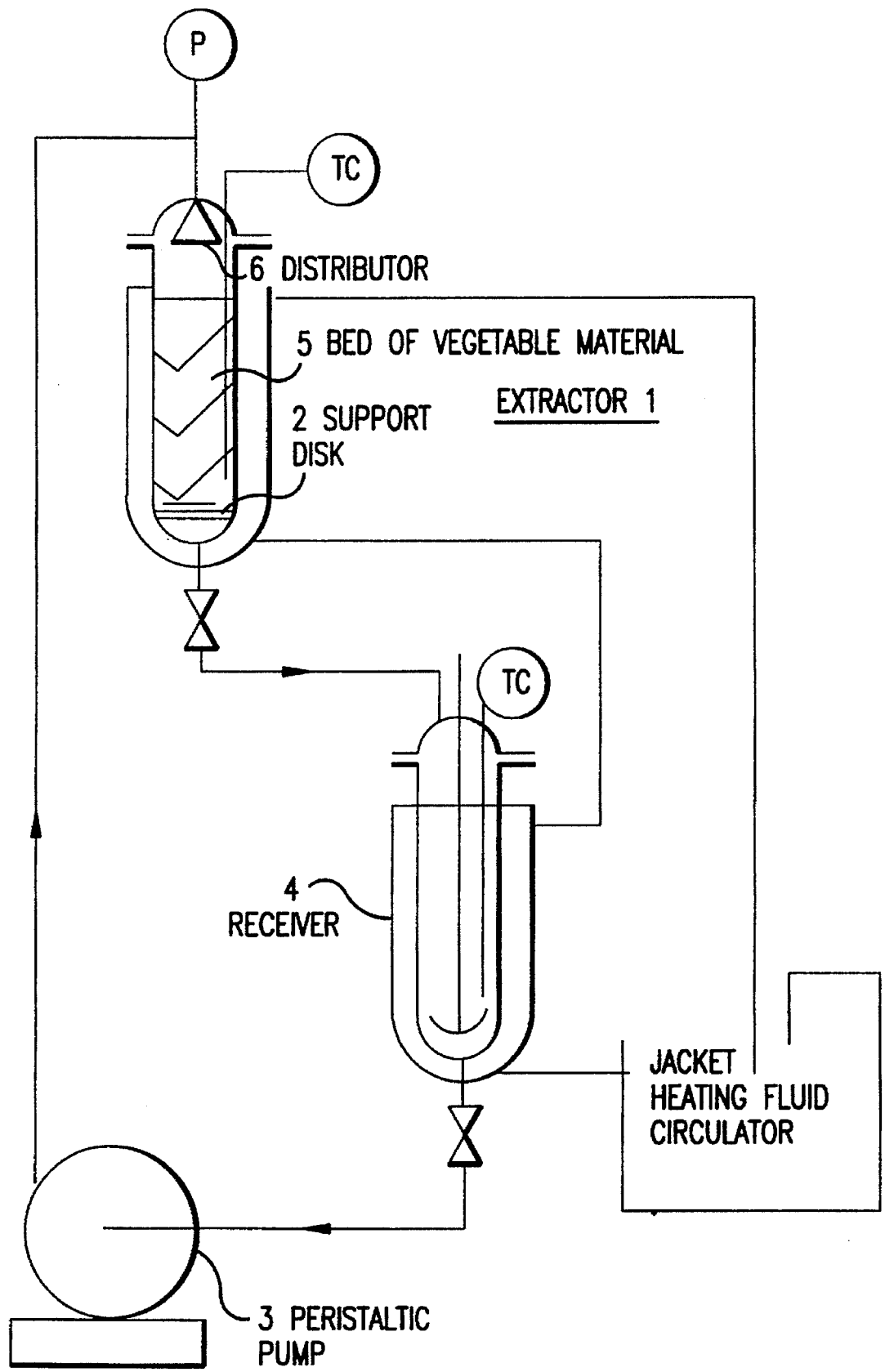
FIG. 1 is a schematic diagram of a laboratory percolation apparatus for the hydrolysis and extraction of polysaccharides from vegetable material.

The process of this invention for extracting soluble polysaccharides from solid vegetable material can be applied, for example, to (1) algin extraction from brown seaweeds, (2) agar extraction from red-purple seaweeds, (3) hemicellulose extraction from seed coats of corn, wheat, oats, barley, rice, soybeans, and larch wood, (4) gum extraction from flax seeds, psyllium seeds, and quince seeds, (5) carrageenan extraction from red seaweeds, and (6) pectin extraction from pectin-containing vegetable material such as, for example, fresh or dry lemon, lime, and grapefruit peel; apple pomace; sugar beet cossettes (thin strips), and sunflower heads or mixtures thereof. "Soluble polysaccharide" is defined as any polysaccharide soluble in the extraction medium. Although the process of recovering soluble polysaccharides from vegetable material is commonly referred to as "extraction", the polysaccharide must first be chemically liberated from the vegetable material by a hydrolysis reaction before it is actually extracted.

The process of this invention is a percolation process in which the polysaccharide is extracted from vegetable material by passing an extraction fluid through a fixed bed of a polysaccharide-containing vegetable material to simultaneously hydrolyze and extract the polysaccharide from the vegetable material and at the same time separate the polysaccharide-containing solution from the remaining solid vegetable material. The solution containing the extracted polysaccharide is subsequently referred to as the polysaccharide extract. A fixed bed is defined as one in which the pieces of vegetable material do not move relative to each other. Since the vegetable material is not disrupted to form dispersed solids, the bed acts as a filter to yield a remarkably clear extract without an additional filtration step.

The process of this invention is particularly suitable for extracting pectin from vegetable material. Pectin consists mainly of partially methoxylated galacturonic acids joined in long chains. Traditional jelly grade pectin has a high molecular weight (>100,000 g/mol) and a high methoxyl content (degree of esterification (DE) >50%) and is typically obtained from citrus peel. Sugar beet pectin has a lower molecular weight (≦100,000 g/mol) and a higher acetyl content than citrus pectin. It is generally not used for jelly, but can be used for other food applications. Pectin molecular weights can be determined using the method described in Christensen, P. E., Methods of Grading Pectin in Relation to the Molecular Weight (Intrinsic Viscosity) of Pectin, *Food Research* 19, 163 (1954).

The extraction fluid to be used for any particular polysaccharide can easily be determined by one skilled in the art. For example, water or an aqueous solution containing calcium hydroxide is typically used for extracting carrageenan; a hot aqueous alkaline solution is typically used for extracting algin; hot water is typically used for extracting agar, and a dilute aqueous solution of either an acid or a base is typically used for extracting pectin. Acid extraction is preferred for high molecular weight pectins that have a high degree of esterification (DE), i.e., >50%. Any acid can be used, but mineral acids are preferred. Nitric acid is most preferred. Extraction with a dilute base is preferred for low molecular weight pectins with a low degree of esterification. Any strong base can be used, e.g., sodium or potassium hydroxide. Extraction with a dilute acid is preferred for low molecular weight pectins with a high degree of esterification. In this specification "dilute" means a concentration of 0.01 to 2.0% by weight. A concentration of 0.3 to 0.6% is usually preferred, but the concentration used depends upon the pectin molecular weight that is desired.

Since the polysaccharide extract solutions are typically viscous (5–30 cp), percolation rates can be relatively slow. A filler that is inert to the extraction fluid is sometimes mixed with the polysaccharide-containing vegetable material to increase the rate of percolation of the extraction fluid through the bed of vegetable material, but a filler is not required. The inert fillers add support to the bed and create voids for liquid percolation. Natural materials such as peanut hulls, sunflower hulls, and wood fiber, or mixtures thereof, are the preferred fillers.

The amount of polysaccharide extracted from the vegetable material is determined by the extraction time, temperature, pH, and the size and type of vegetable material. In the case of pectin, the same amount of pectin can be extracted by using a higher concentration of acid or base and a higher temperature for a shorter period of time, or using a lower acid or base concentration and a lower temperature for a longer period of time. Using a high concentration of acid or base at a higher temperature will require less time than using a lower temperature or a lower acid or base concentration. For extracting high molecular weight pectin, the following conditions are typically used: temperature 60° to 95° C., preferably 70° C.; time 30 minutes to 10 hours, preferably about 5 hours; pH 1 to 3, preferably about 1.8. The conditions used for extraction of low molecular weight pectin fall within the same ranges of temperature, time and pH given above, with the preferred conditions being a temperature of about 90° C., a time of about 2.5 hours, and a pH of about 1.2.

The percent of polysaccharide liberated is defined as the total mass of polysaccharide liberated from the vegetable material divided by the mass of the vegetable material on a dry basis. The percentage of polysaccharide recovered is defined as the mass of polysaccharide recovered in the extract divided by the mass of polysaccharide liberated.

Higher polysaccharide recoveries can be obtained by washing repeatedly with water after passing the aqueous acid or base solution through the bed of vegetable material.

The apparatus used in Examples 1–8 is illustrated in FIG. 1. The extractor consists of a jacketed, cylindrical vessel (1) having a removable top and a support disk (2) positioned near the bottom. The extraction fluid is pumped via a peristaltic pump (3) from a second jacketed vessel, the receiver (4), through an insulated line to the top of the bed of vegetable material (5). The liquid passes through a distributor (6) and drains through the bed (5) and the support disk (2) back into the filtrate receiver (4). The temperature of both vessels is controlled by the circulation of an ethylene glycol/water mixture through the jacket. The temperature can be carefully monitored with probes located in both vessels (1) and (4). The pressure drop across the bed of vegetable material can be controlled by the liquid level above the bed. In the FIGURE, P is a pressure gauge and TC is a thermocouple.

Countercurrent extractors are preferred because they recover more of the available polysaccharide that is hydrolyzed from the vegetable material. The preferred embodiment of the invention is a continuous countercurrent process as demonstrated in Examples 9 and 10. There are a number of different geometries that can be used to achieve a countercurrent percolation process. For example, a horizontal extractor in which the solids move along a conveyer belt is a common geometry, or a rotary countercurrent extractor can be used.

EXAMPLE 1

Fresh lemon peel (400 g) that had been frozen and then thawed and contained 14.9% solids was charged to the extractor. An aqueous solution (600 g) containing 0.40 wt % nitric acid was charged to the receiving vessel. The dilute acid solution was circulated through the peel bed at 70° C. for 5 hours. The initial bed height was 15 cm and decreased to 8.5 cm at the end of the extraction. The circulation rate of the liquid corresponded to a percolation rate of 1.2 cm/min at the beginning of the extraction and 1.0 cm/min at the end. It was necessary to decrease the liquid circulation rate as the drainage rate through the peel bed decreased over time. After 5 hours, the extracted juice contained 1.59% pectin and was clear. The pectin liberated from the peel represented 21.9% of the peel solids. The actual pectin in the extract was 60% of the total pectin chemically liberated from the peel, with the other 40% contained in the wet peel bed (see Table 1).

EXAMPLE 2

Fresh grapefruit peel that had been frozen and then thawed (600 g) and contained 11.3% solids was charged to the extractor. An aqueous solution (1000 g) containing 0.40 wt % nitric acid was charged to the receiving vessel. The dilute nitric acid solution was circulated through the peel bed at 70° C. for 5 hours. The initial bed height was 14 cm and decreased to 11 cm at the end of the extraction. The liquid circulation rate corresponded to a percolation rate of 1.2 cm/min, and this rate was maintained for the entire extraction. The extract contained 1.32% pectin and was clear. The pectin liberated from the peel represented 32.3% of the peel solids (see Table 1).

EXAMPLE 3

Dried lime peel (150 g) containing 86.3% solids was mixed with 100 g of sunflower hulls and charged to the extractor. An aqueous solution (4150 g) containing 0.40 wt % nitric acid was charged to the receiving vessel. The dilute nitric acid solution was circulated through the peel bed at 70° C. for 4.5 hours. The bed height was constant at 21 cm for the entire extraction. The percolation rate started at 51 cm/min and ended at 6.5 cm/min. The extract contained 0.86% pectin and was clear. The pectin liberated from the peel represented 28.1% of the peel solids (see Table 1).

EXAMPLE 4

Dried lemon peel (257 g) containing 86.0% solids was charged to the extractor. An aqueous solution (4555 g) containing 0.26 wt % sodium hydroxide was charged to the receiving vessel. The dilute caustic solution was circulated through the peel bed at 50° C. for 2.0 hours. The bed height started at 22 cm and swelled to 27 cm during the extraction. The percolation rate started at 57 cm/min and ended at 6.6 cm/min. The extract contained 1.14% pectin and was dark brown and free of particulates. The pectin liberated from the peel represented 22.5% of the peel solids (see Table 1).

EXAMPLE 5

Dried grapefruit peel (250 g) containing 87.5% solids was mixed with 125 g of peanut hulls and charged to the extractor. An aqueous solution (4050 g) containing 0.60 wt % nitric acid was charged to the receiving vessel. The dilute nitric acid solution was circulated through the peel bed at 90° C. for 2.3 hours. The bed height started at 29 cm and swelled to 31 cm during the extraction. The percolation rate started at 52 cm/min and ended at 6.2 cm/min. The extract contained 1.73% pectin and was clear. The pectin liberated from the peel represented 33.0% of the peel solids (see Table 1).

EXAMPLE 6

Undried sugar beet cossettes that had been frozen and then thawed (1000 g) containing 25.7% solids were charged to the extractor. An aqueous solution (4000 g) containing 0.60 wt % nitric acid was charged to the receiving vessel. The dilute nitric acid solution was circulated through the peel bed at 90° C. for 2.0 hours. The bed height started at 28 cm and finished at 25 cm. The percolation rate started at 52 cm/min and ended at 6.5 cm/min. The extract contained 1.31% pectin and was clear. The pectin liberated from the peel represented 24.7% of the sugar beet solids (see Table 1).

EXAMPLE 7

Dried lemon peel (200 g) containing 86.0% solids was mixed with 100 g of almond hulls and charged to the extractor. A five-stage countercurrent extraction was simulated by contacting the peel with solutions containing both pectin and 0.60 wt % nitric acid. The first solution was 4300 g of 0.60 wt % nitric acid and 1.08 wt % pectin in water and was charged to the receiving vessel. The first extraction stage proceeded by circulating this solution through the peel bed at 90° C. for 30 minutes. After 30 minutes, the first extract containing 1.83 wt % pectin was removed. The second stage started with 4300 g of a 0.59 wt % pectin solution. After 30 minutes of percolation at 90° C., this extract contained 0.98 wt % pectin. The third, fourth, and fifth stages were all conducted in the same manner. The starting concentrations were 0.30 wt %, 0.15 wt %, and 0 wt % pectin, respectively. The ending concentrations for stages 3–5 were 0.54 wt %, 0.37 wt %, and 0.17 wt %, respectively. The bed height ranged from 23–20 cm and the percolation rate ranged from 56–5.3 cm/min during the extraction. The total amount of pectin liberated during the extraction was 30.3% of the peel solids, and the actual pectin recovered was 29.2%, representing a 96% recovery of the liberated pectin (see Table 1).

TABLE 1

Percolation Results for Pectin Extractions

| Example # | Peel Type & Filler Added | Batch % Solids[a] | Extraction Solution | Temp. (°C.) | Time (hr) | Perc. rate (cm/min)[b] | Bed Ht. (cm)[b] | Pectin (wt %) | % Pectin liberated[c] |
|---|---|---|---|---|---|---|---|---|---|
| 1 | Fresh lemon | 5.9 | 0.40 wt % $HNO_3$ | 70 | 5.0 | 1.2–1.0 | 15–8.5 | 1.59 | 21.9 |
| 2 | Fresh grapefruit | 3.9 | 0.40 wt % $HNO_3$ | 70 | 5.0 | (No Change) 1.2 | 14–11 | 1.32 | 32.3 |
| 3 | Dry lime & 40 wt % sunflower hulls | 3.0 | 0.40 wt % $HNO_3$ | 70 | 4.5 | 51–6.5 | (No Change) 21 | 0.86 | 28.1 |
| 4 | Dry lemon | 4.9 | 0.26 wt % NaOH | 50 | 2.0 | 57–6.6 | 22–27 | 1.14 | 22.5 |
| 5 | Dry grapefruit & 33 wt % peanut hulls | 5.1 | 0.60 wt % $HNO_3$ | 90 | 2.3 | 52–6.2 | 29–31 | 1.73 | 33.0 |
| 6 | Fresh sugar beets | 5.1 | 0.60 wt % $HNO_3$ | 90 | 2.0 | 52–6.5 | 28–25 | 1.31 | 24.7 |
| 7 | Dry lemon & 33 wt % almond hulls | 3.8 | 0.60 wt % $HNO_3$ | 90 | 2.5 | 56–5.3 | 23–20 | 1.83 | 30.3 |

[a]The batch of solids (peel solids/total peel and liquid in the system) is a measure of the peel/liquid ratio.
[b]The values for the bed heights and percolation rates represent initial and final values.
[c]The % pectin liberated is defined as the pectin mass in the liquid phase at the end of the extraction divided by the mass of peel solids on a dry basis.

EXAMPLE 8

Dry seaweed (*Eucheuma spinosum*) (100 g) containing 72% solids was mixed with 100 g of peanut hulls and charged to the extractor shown in FIG. 1. Deionized water (2900 g) was charged to the receiving vessel. The extraction proceeded by circulating the water through the seaweed/peanut hull bed at 95° C. for 2 hours. The bed height started at 19 cm and decreased to 18 cm at the end of the extraction. The percolation rate started at 37 cm/min and ended at 8.7 cm/min. The extract contained 1.39% carrageenan and was a brown liquid. The carrageenan liberated from the seaweed represented 58% of the seaweed solids.

EXAMPLE 9

An extraction was conducted using a feed stream of 55 wt % dried grapefruit peel (~90% solids) mixed with 45 wt % peanut hulls. A Rotocel® rotary extractor with a diameter of four feet, available from Davy International, Pittsburgh, Pa., U.S.A., was used for the extraction. The solids feed rate was 5.2 kg/hr, the aqueous 0.40 wt % nitric acid feed rate was 65 kg/hr (0.29 gal/min), the average temperature was 70° C., the extraction time was 4 hours, and the bed height averaged about 32 cm. The recovered extract was a clear liquid produced at a rate of 54 kg/hr (0.24 gal/min). The recovered extract contained 1.40 wt % pectin, which represented 29% of the peel solids charged, and an estimated 97% recovery of the liberated pectin.

EXAMPLE 10

An extraction was conducted using a feed stream of 55 wt % dried grapefruit peel (~90% solids) mixed with 45 wt % peanut hulls. A Rotocel® rotary extractor with a diameter of four feet, available from Davy International, Pittsburgh, Pa., U.S.A., was used for the extraction. The solids feed rate was 9.7 kg/hr, the aqueous 0.60 wt % nitric acid feed rate was 119 kg/hr (0.53 gal/min), the average temperature was 87° C., the extraction time was 2 hours, and the bed height averaged about 32 cm. The extract was a clear liquid produced at a rate of 97 kg/hr (0.43 gal/min). The extract contained 1.62 wt % recovered pectin, which represented 32% of the peel solids charged, and an estimated 97% recovery of the liberated pectin.

It is not intended that the examples given here should be construed to limit the invention, but rather they are submitted to illustrate some of the specific embodiments of the invention. Various modifications and variations of the present invention can be made without departing from the scope of the appended claims.

We claim:

1. A process for the extraction of soluble polysaccharides from solid vegetable material comprising percolating an extraction fluid through a fixed bed of a polysaccharide-containing vegetable material mixed with a filler to simultaneously hydrolyze and extract the polysaccharide from the vegetable material and separate a polysaccharide-containing solution from the remaining solid vegetable material.

2. The process of claim 1, wherein the soluble polysaccharide is pectin.

3. The process of claim 2, wherein the vegetable material is selected from the group consisting of fresh and dried citrus peel, apple pomace, sugar beet cossettes, sunflower heads, and mixtures thereof.

4. The process of claim 3, wherein the vegetable material is citrus peel and the process is a countercurrent extraction process.

5. The process of claim 2, wherein the pectin has a molecular weight less than or equal to 100,000 g/mol and a low degree of esterification and the extraction fluid is a dilute acid solution.

6. The process of claim 2, wherein the pectin has a molecular weight greater than 100,000 g/mol and a high degree of esterification and the extraction fluid is a dilute acid solution.

7. The process of claim 6, wherein the vegetable material is citrus peel and the process is a countercurrent extraction process.

8. The process of claim 7, wherein a filler is mixed with the citrus peel.

9. The process of claim 8, wherein the filler is selected from the group consisting of peanut hulls, sunflower seed hulls, wood fiber, and mixtures thereof.

10. The process of claim 2, wherein the pectin has a molecular weight less than or equal to 100,000 g/mol and a low degree of esterification, and the extration fluid is a dilute base solution.

11. The process of claim 1, wherein the process is a countercurrent extraction process.

12. The process of claim 1, wherein the filler is selected from the group consisting of peanut hulls, sunflower seed hulls, wood fiber, and mixtures thereof.

13. The process of claim 1, wherein the soluble polysaccharide is carrageenan and the vegetable material is a red seaweed.

14. The process of claim 13, wherein the filler is mixed with the red seaweed.

15. The process of claim 14, wherein the filler is selected from the group consisting of peanut hulls, sunflower seed hulls, wood fiber, and mixtures thereof.

16. The process of claim 13, wherein the process is a countercurrent extraction process.

17. A process for extracting a polysaccharide from solid vegetable material comprising percolating an extraction fluid through a fixed bed of polysaccharide containing solid vegetable material in a direction countercurrent to direction of movement of the fixed bed to simultaneously hydrolyze, extract, and separate the polysaccharide from the vegetable material.

18. The process for extracting a polysaccharide from solid vegetable material of claim 17 wherein the process is continuous and the fixed bed is passed through a plurality of stages of countercurrent extractors.

19. The process of claim 18, wherein the countercurrent flow occurs in a rotary extractor.

20. The process of claim 17, wherein the soluble polysaccharide is pectin.

21. The process of claim 20, wherein the pectin has a molecular weight less than or equal to 100,000 g/mol and a high degree of esterification and the extraction fluid is a dilute acid solution.

22. The process of claim 20, wherein the pectin has a molecular weight greater than 100,000 g/mol and a high degree of esterification and the extration fluid is a dilute acid solution.

23. The process of claim 22, wherein the vegetable material is citrus peel and the process is a countercurrent extraction process.

24. The process of claim 23, wherein a filler is mixed with the citrus peel.

25. The process of claim 24, wherein the filler is selected from the group consisting of peanut hulls, sunflower seed hulls, wood fiber, and mixtures thereof.

26. The process of claim 20, wherein the pectin has a molecular weight less than or equal to 100,000 g/mol and a low degree of esterification, and the extraction fluid is a dilute base solution.

27. The process of claim 17, wherein the vegetable material is selected from the group consisting of fresh and dried citrus peel, apple pumice, sugar beet cossets, sunflower heads, and mixtures thereof.

28. The process of claim 17, wherein the polysaccharide is carrageenan and the vegetable material is a red seaweed.

29. The process of claim 28, wherein a filler is mixed with the red seaweed.

30. The process of claim 29, wherein the filler is selected from the group consisting of peanut hulls, sunflower seed hulls, wood fiber, and mixtures thereof.

* * * * *